United States Patent
Goldberg et al.

(10) Patent No.: US 10,339,582 B2
(45) Date of Patent: Jul. 2, 2019

(54) SYSTEM AND METHOD FOR INCREASING LOCATION AWARENESS OF ORGANIZATIONS

(71) Applicant: GOOGLE INC., Mountain View, CA (US)

(72) Inventors: Tal Goldberg, Tel-Aviv (IL); Gal Moshitch, Tel-Aviv (IL); Karin Zilberstein, Tel-Aviv (IL); Roy Timor, Tel-Aviv (IL); Omer Koren, Tel-Aviv (IL)

(73) Assignee: GOOGLE LLC, Mountain View, CA (US)

( * ) Notice: Subject to any disclaimer, the term of this patent is extended or adjusted under 35 U.S.C. 154(b) by 534 days.

(21) Appl. No.: 15/269,252

(22) Filed: Sep. 19, 2016

(65) Prior Publication Data

US 2018/0060934 A1 Mar. 1, 2018

Related U.S. Application Data

(60) Provisional application No. 62/380,953, filed on Aug. 29, 2016.

(51) Int. Cl.
*G06Q 30/06* (2012.01)
*G06F 3/0481* (2013.01)
*G06F 16/29* (2019.01)
*G06F 16/9537* (2019.01)

(52) U.S. Cl.
CPC ..... *G06Q 30/0623* (2013.01); *G06F 3/04812* (2013.01); *G06F 3/04817* (2013.01); *G06F 16/29* (2019.01); *G06F 16/9537* (2019.01)

(58) Field of Classification Search
CPC .................................................. G06Q 30/06
USPC ................................................................ 705/26
See application file for complete search history.

(56) References Cited

PUBLICATIONS

Waze Maps (2016). Retrieved from the Internet at: http://media.148apps.com/screenshots/323229106/us-iphone-1-waze-gps-navigation-maps-and-social-traffic.jpeg.

*Primary Examiner* — Russell S Glass
(74) *Attorney, Agent, or Firm* — Marshall, Gerstein & Borun LLP

(57) ABSTRACT

To measure the increase in location awareness for an organization's locations using a map display, a server device identifies each of the locations belonging to an organization and applies a random filter to select a subset of the locations. An indication of the organization is presented on a map display at each of the selected organization locations within the subset. When an indication of the organization location is presented to a user a threshold number of times, an icon such as a question mark may be presented in place of the indication at the organization location. The icon may provide a link to a location awareness survey which may request that the user identifies the organization corresponding to the location. Several users may receive the location awareness survey for the same organization location and the users' answers may then be analyzed to determine a location awareness metric.

20 Claims, 6 Drawing Sheets

SYSTEM AND METHOD FOR INCREASING LOCATION AWARENESS OF ORGANIZATIONS

CROSS-REFERENCE TO RELATED APPLICATIONS

This application claims priority to provisional U.S. Application Ser. No. 62/380,953, filed on Aug. 29, 2016, entitled "System and Method for Increasing Location Awareness of Organizations," the entire disclosure of which is hereby expressly incorporated by reference herein.

FIELD OF THE DISCLOSURE

The present disclosure relates to displaying map data and, more particularly, to increasing location awareness of businesses or other organizations presented on a map display of a geographic area.

BACKGROUND

Today, digital maps of geographic areas are displayed on computing devices, such as computers, tablets, and mobile phones via map applications, web browsers, etc. Many map applications display points of interest (POIs), such as businesses or other organizations on the map. Each POI may be displayed using an icon or other indicator of the type of POI (e.g., a restaurant symbol for restaurants, a shopping symbol for department stores, etc.).

Additionally, the map applications may include advertisements for some of the organizations at corresponding locations on the map.

SUMMARY

To measure and improve users' awareness of geographic locations associated with a certain organization, a location awareness system provides a user with indications that these locations are associated with the organization, subsequently automatically replaces some or all of these indications with marks that no longer convey the association with the organization, and prompts the user to signal familiarity with the location. As used herein, an "organization" may refer to a business or other entity. The location awareness system then can generate metrics of location awareness and/or of changes in location awareness as a result of exposure. The location awareness system can use these metrics to select geographic locations for displaying commercial data such as coupons or advertisements, or other geospatial data such as event announcements, news alerts, etc.

As discussed below, the location awareness system can include, or cooperate with, a geographic application on a client computing device that displays indications of the organization at corresponding locations on a digital map within a viewport defining the currently visible portion of the digital map. The location awareness system can generate indications that catch the user's attention and make the user aware of the organization at the corresponding locations. For example, an indication may be a logo or other symbol for the organization (a branded pin), an advertisement for the organization, a pin adjacent to the name of the organization, etc. To determine whether the display of these indications increases users' awareness of the locations associated with the organization, the geographic application can display interactive icons such as a question mark with a link to a location awareness survey asking the user which organization corresponds to the organization location. The location awareness survey also may include answer choices, such as the organization, competitors of the organization, and "I'm not sure."

The location awareness system can select for display only a subset of the locations corresponding to an organization ("organization locations") and visible within the viewport. The location awareness system in this manner can distinguish between users who recognize the brand of the organization rather than the particular geographic locations of the organization. For example, a geographic application operating on a client device as part of the location awareness system can display indications of the organization at 90 percent of the locations ("exposed organization locations") and not display the remaining 10 percent of the locations ("unexposed organization locations"). In some scenarios, the geographic application may display an icon such as a question mark at the unexposed organization location. The icon may provide a link to a location awareness survey asking the user which organization corresponds to the unexposed organization location. In this manner, users who answer the location awareness survey for unexposed organization locations may provide a control in the test for location awareness to filter out brand awareness. Thus, an increase in location awareness for a particular organization location may be determined based on the difference between the number of users who correctly identified the organization after being exposed to the organization location and the number of users who correctly identified the organization without being exposed to the organization location.

By not displaying some of the organization locations to provide a control group, the location awareness system can advantageously measure location awareness for all organization's locations at once. This generally results in significant improvement in processing time relative to an example implementation in which a system provides an indication of an actual organization location to some users and an indication of a simulated (or "fake") location to other users, one location at a time.

One example embodiment of the techniques of this disclosure is a method for measuring location awareness of organizations on a map display. The method includes identifying, for a particular organization, a plurality of locations to present on a map display of a geographic area and applying a random selection function to select a subset of the plurality of organization locations, where the subset includes fewer locations than the plurality of organization locations. The method further includes causing the map display of the geographic area to be presented to a user including placing an indication of the organization at each of the subset of organization locations on the map display. When an organization location within the geographic area has been presented to the user a predetermined threshold number of times, the method includes causing an icon to be presented in place of the indication of the organization at the organization location, where the icon does not identify the organization. In response to receiving a selection of the organization location represented by the icon, the method further includes causing a request to be presented for the user to identify the organization corresponding to the organization location, where the request includes an indication of the organization and an indication of at least one other organization and providing, to an organization computing device, a location awareness metric for the organization location based on the user's response to the request to identify the organization, where the location awareness metric is indicative of commercial content presented on the map display.

Moreover, the method includes receiving commercial content for placement at specific geographic locations on the map display in accordance with the location awareness metric.

Another example embodiment is a computing device for measuring location awareness, where the computing device includes one or more processors and a non-transitory computer-readable memory coupled to the one or more processors and storing thereon instructions. The instructions, when executed by the one or more processors, cause the computing device to identify, for a particular organization, a plurality of locations to present on a map display of a geographic area, apply a random selection function to select a subset of the plurality of organization locations, where the subset includes fewer locations than the plurality of organization locations, and cause the map display of the geographic area to be presented to a user including placing an indication of the organization at each of the subset of organization locations on the map display. When an organization location within the geographic area has been presented to the user a predetermined threshold number of times, the instructions cause the computing device to cause an icon to be presented in place of the indication of the organization at the organization location, wherein the icon does not identify the organization and in response to receiving a selection of the organization location represented by the icon, cause a request to be presented for the user to identify the organization corresponding to the organization location, where the request includes an indication of the organization and an indication of at least one other organization. The instructions further cause the computing device to provide, to an organization computing device, a location awareness metric for the organization location based on the user's response to the request to identify the organization, where the location awareness metric is indicative of commercial content presented on the map display and receive commercial content for placement at specific geographic locations on the map display in accordance with the location awareness metric.

Yet another example embodiment is a client computing device for measuring location awareness, where the client computing device includes a user interface, one or more processors coupled to the user interface, and a non-transitory computer-readable memory coupled to the one or more processors and storing thereon instructions. The instructions, when executed by the one or more processors, cause the client computing device to present a map display of a geographic area on the user interface, where the geographic area includes a plurality of locations for a particular organization and present an indication of the organization at each of a subset of the plurality of organization locations on the map display of the geographic area, where the subset of organization locations includes fewer locations than the plurality of organization locations within the geographic area. When an organization location within the geographic area has been presented to a user a predetermined threshold number of times, the instructions cause the client computing device to present an icon in place of the indication of the organization at the organization location, where the icon does not identify the organization, in response to receiving a selection of the organization location represented by the icon, present a request for the user to identify the organization corresponding to the organization location, where the request includes an indication of the organization and an indication of at least one other organization and present commercial content at specific geographic locations on the map display based on the user's response to the request to identify the organization.

DETAILED DESCRIPTION

Overview

Figure 1:
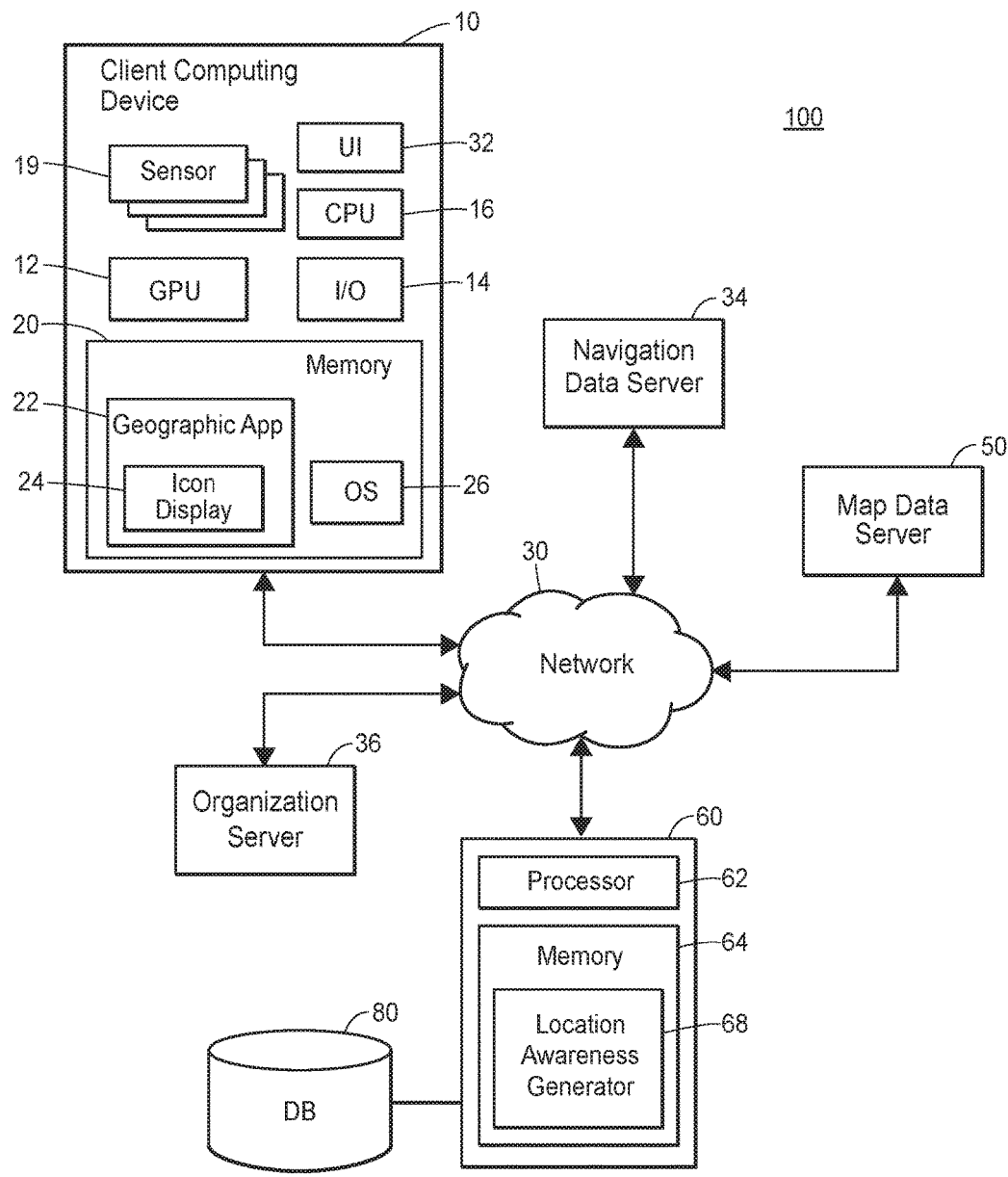
FIG. 1 is a block diagram of an example system in which techniques for measuring and improving location awareness of organizations presented on a client computing device can be implemented.

A location awareness system of this disclosure can be implemented in one or more servers and/or client devices to increase users' awareness of locations of a business or other organization within a map display. To measure the increase in location awareness, a client computing device may expose a user to a particular organization location by presenting an indication of the organization (e.g., McDonald'S™) at the location on a map display of a geographic area. The indication may be a pin with the name or logo for the organization or may be an advertisement for the organization. When the user is exposed to the location a sufficient number of times and/or for a sufficient amount of time, the location awareness system may determine whether the user can identify the organization corresponding to the location by causing the client computing device to generate a different version of the digital map and place a question mark or other icon on the map display where the pin or advertisement were previously placed, for example. When the user selects the question mark or the location represented by the icon, the client device may display a location awareness survey asking the user to name the organization corresponding to the location. The location awareness survey may include several options from which the user can choose, including the correct organization and incorrect organizations.

To ensure that users actually identify the location of the organization rather than simply the brand of the organization, the location awareness system may not expose the user to some organization locations by not presenting an indication of the organization for the unexposed locations on the map display. For example, the location awareness system may expose the user may to 90 percent of the McDonald'S™ locations within a geographic area covered by the map viewport and not expose the remaining 10 percent. The location awareness in one example implementation applies a random filter, or another suitable sampling technique, to determine which locations to present on the map display. As a result, each user may view a different subset of the organization locations on the user's client computing device.

In some scenarios, the location awareness system may determine whether the user is recognizing the brand by causing the client computing device to place the question mark or other selectable icon on the map display at an unexposed location within the geographic area. Then, for the same location, the location awareness system may compare the number of users who correctly identified the corresponding organization when the organization was exposed to the number of users who correctly identified the corresponding organization when the organization was unexposed. When the number of users in both scenarios is the same or within a certain margin of error (e.g., 5%), the location awareness system may determine that users recognize the brand but not specific organization locations. On the other hand, when the number of users who correctly identified the corresponding organization when the organization location is exposed exceeds the number of users who correctly identified the corresponding organization when the organization location is unexposed, by a significant margin (e.g., 5%), the location awareness system may determine that location awareness increased for the location.

The location awareness system may transmit the change in location awareness, or some other location awareness metric, to a computing system operating in the organization. The location awareness metric may be indicative of how successful an item of commercial content is at making users aware of the organization location. As a result, the organization can adjust the selection of geographic locations for presenting commercial content, and the client computing device accordingly may present commercial content at specific geographic locations on the map display based on the location awareness metric. Alternatively, the location awareness system can automatically adjust the selection of geographic locations for presenting commercial content, without requesting these adjustments from the organization.

In this manner, the location awareness system may identify location awareness while filtering for brand awareness. Instead of using one real location and one simulated location at a time to test whether users can correctly identify an organization location, the location awareness system may use all organization locations at once. Therefore, the number of locations where location awareness is measured simultaneously may increase by a factor of n, where n is the number of locations for a particular organization (e.g., McDonald'S™). The increase in speed can be very significant, particularly when an organization such as McDonald'S™ includes thousands of locations. The location awareness system of this disclosure can measure location awareness n times faster compared to alternative systems.

Example Hardware and Software Components

Referring to FIG. 1, an example communication system 100 in which a location awareness system can be implemented includes a client computing device 10, such as a client computing device configured to execute a geographic application 22, which also can be referred to as "mapping application 22." Depending on the implementation, the application 22 can display an interactive digital map, request and receive routing data to provide driving, walking, or other navigation directions, provide various geolocated content, etc.

In addition to the client computing device 10, the communication system 100 includes a server device 60 configured to provide a map display to the client computing device 10. The server device 60 can be communicatively coupled to a database 80 that stores, in an example implementation, indications of organizations which may be presented on the map display. For example, an indication of an organization may be a logo or other symbol for the organization, an advertisement for the organization, a pin adjacent to the name of the organization, etc. The database 80 may also store location awareness data for each organization. Location awareness data may include the number of users who correctly identified an organization after being exposed to the organization location and/or the number of users who correctly identified the organization without being exposed to the organization location. Location awareness data may also include a ratio or likelihood that the users who were exposed to the organization location subsequently identified the correct organization for the organization location and/or a ratio or likelihood that the users who were not exposed to the organization location identified the correct organization for the organization location. Furthermore, the database 80 may store relationships between organizations, such as the type of industry for each organization and an organization's competitors. In this manner, the location awareness engine 68 implemented in the server device 60 may provide an organization's competitors as incorrect answer choices to a location awareness survey regarding an organization location. In some implementations of the location awareness systems, representatives of the organizations operate certain controls and/or install certain applications to allow the server 60 to display the names or logos of the organizations in this manner.

More generally, the server device 60 can communicate with one or several databases that store any type of suitable geospatial information or information that can be linked to a geographic context, such as coupons or offers. The communication system 100 also can include a navigation data server 34 that provides driving, walking, biking, or public transit directions, for example. Further, the communication system 100 can include a map data server 50 that provides map data to the server device 60 for generating a map display. Still further, the communication system 100 can include an organization server 36 that receives and transmits data related to a particular organization. For example, the organization server 36 may provide commercial content, such as advertisements, offers, branded pins, etc. to the server device 60. The organization server 36 may also receive data regarding location awareness for the organization, such as a location awareness metric, a brand awareness metric, etc. The devices operating in the communication system 100 can be interconnected via a communication network 30.

In various implementations, the client computing device 10 may be a smartphone or a tablet computer. The client computing device 10 may include a memory 20, one or more processors (CPUs) 16, a graphics processing unit (GPU) 12, an I/O module 14, a user interface (UI) 32 and one or several sensors 19. The memory 20 can be a non-transitory memory and can include one or several suitable memory modules, such as random access memory (RAM), read-only memory (ROM), flash memory, other types of persistent memory, etc. The I/O module 14 may be a touch screen, for example. In various implementations, the client computing device 10 can include fewer components than illustrated in FIG. 1 or conversely, additional components. In other embodiments, the client computing device 10 may be any suitable portable or non-portable computing device. For example, the client computing device 10 may be a laptop computer, a desktop computer, a wearable device such as a smart watch or smart glasses, etc.

Depending on the implementation, the one or more sensors 19 can include a global positioning system (GPS) module to detect the position of the client computing device 10, a compass to determine the direction of the client computing device 10, a gyroscope to determine the rotation and tilt, an accelerometer, etc.

The memory 20 stores an operating system (OS) 26, which can be any type of suitable mobile or general-purpose operating system. The OS 26 can include application programming interface (API) functions that allow applications (such as the mapping application 22) to retrieve sensor readings. For example, a software application configured to execute on the client computing device 10 can include instructions that invoke an OS 26 API for retrieving a current location of the client computing device 10 at that instant. The API can also return a quantitative indication of how certain the API is of the estimate (e.g., as a percentage).

The memory 20 also stores the mapping application 22, which is configured to generate interactive digital maps and/or perform other geographic functions, as indicated above. The mapping application 22 can receive map data in a raster (e.g., bitmap) or non-raster (e.g., vector graphics) format from the map data server 50 and/or the server device 60. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The mapping application 22 also can display driving, walking, or transit directions, and in general provide functions related to geography, geolocation, navigation, etc.

It is noted that although FIG. 1 illustrates the mapping application 22 as a standalone application, the functionality of the mapping application 22 also can be provided in the form of an online service accessible via a web browser executing on the client computing device 10, as a plug-in or extension for another software application executing on the client computing device 10, etc. The mapping application 22 generally can be provided in different versions for different respective operating systems. For example, the maker of the client computing device 10 can provide a Software Development Kit (SDK) including the mapping application 22 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a location awareness engine 68, which can generate indications of organizations, generate location awareness surveys to be displayed by the mapping application 22, and collect location awareness data for several organization locations, etc. The memory 64, or the memory in another server, similarly can store instructions that generate map displays for a geographic area to be displayed by the mapping application 22.

The location awareness engine 68 and the mapping application 22 can operate as components of a location awareness system. Alternatively, the location awareness system can include only server-side components and simply provide the mapping application 22 with instructions to display icons of a certain type, display location awareness surveys, report survey responses, etc. In other words, location awareness assessment and improvement techniques in these embodiments can be implemented transparently to the mapping application 22. As another alternative, the entire functionality of the location awareness engine 68 can be implemented in the mapping application 22.

For simplicity, FIG. 1 illustrates the server device 60 as only one instance of a server. However, the server device 60 according to some implementations includes a group of one or more server devices, each equipped with one or more processors and capable of operating independently of the other server devices. Server devices operating in such a group can process requests from the client computing device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the mapping application 22 operating in the client computing device 10 receives and transmits data to the server device 60. Thus, in one example, the client computing device 10 may transmit a communication to the location awareness engine 68 (implemented in the server device 60) indicating that a user of the client computing device 10 chose to participate in a location awareness survey. Accordingly, the location awareness engine 68 may identify all locations corresponding to an organization. In some embodiments, the location awareness engine 68 may identify locations by communicating with the map data server 50. The location awareness engine 68 then may apply a random selection function, such as a random filter to randomly select a threshold amount (e.g., 75, percent, 80 percent, 90 percent, etc.) of the organization locations (a subset of organization locations) to display to the user.

The server device 60 may also receive a request for map data for a geographic area from the client computing device 10 including a geographic location, such as the current location of the user. In response to the request, the server device 60 may transmit map data for the geographic location to the client computing device 10 which may be used to present a map display. The server device 60 may also generate and transmit indications of the organization to the icon display 24 implemented in the mapping application 22. The icon display 24 may then present the indications of the organization on the map display at the selected organization locations that are within the geographic area. Indications of the organization may not be presented at unselected organization locations even when they are within the geographic area.

In another implementation, the location awareness engine 68 may transmit map data for a geographic region (e.g., a country, a state, etc.) to the client computing device 10 along with indications of each of the selected organization locations. When a user selects a particular map viewport depicting a geographic area within the geographic region by panning or zooming on the map display, the client computing device 10 may determine which selected organization locations are within the geographic area corresponding to the map viewport. Then the icon display 24 in the client computing device 10 may present an indication of the organization at each selected organization location for the map viewport.

Example Map Displays Depicting Geographic Areas and Organization Locations

Figure 2A:
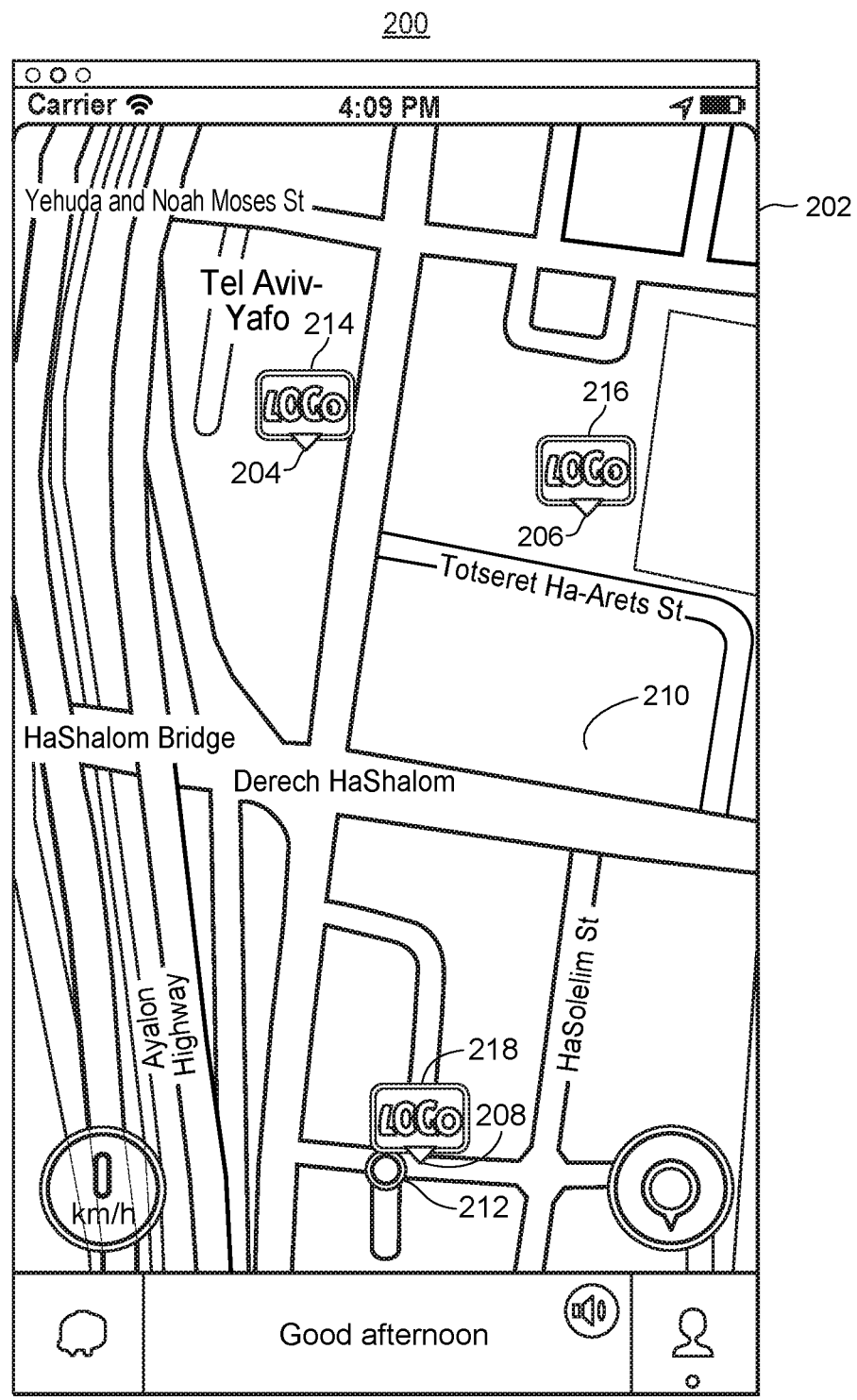
FIG. 2A is an example map display which the location awareness system of FIG. 1 can generate to display exposed organization locations and not display unexposed organization locations for a particular organization.

FIG. 2A illustrates an example map display 200 including a map viewport 202 depicting a portion of Tel Aviv, Israel. The map viewport 202 may include a dot 212 or other indication marking the user's current location within the map display 200. In some scenarios, the map viewport 202 may depict a geographic area surrounding the user's current location. In other scenarios, the map viewport 202 may depict another geographic area selected by the user (e.g., by panning or zooming the map) or may depict a geographic area selected by the server device 60 when the user chooses to participate in a location awareness survey. For example, the server device 60 may select geographic areas which include particular organization locations to present to the user.

In some embodiments, the server device 60 may generate the map display 200 and instruct the client computing device 10 to display map display 200 via the icon display 24, implemented in the mapping application 22. In other embodiments, the server device 60 may generate map data for the map viewport 202, indications of organizations located within the map viewport 202, and selected locations at which to present the indications within the map viewport 202. The server device 60 may then transmit the map data, indications, and selected locations to the client computing device 10 for rendering the map display 200.

In yet other embodiments, the server device 60 may generate map data for a geographic region (e.g., Israel, the entire world, etc.), indications of organizations located within the geographic region, and selected locations at which to present the indications within the geographic region. The server device 60 may transmit the map data, the indications, and the selected locations to the client computing device 10, and the client computing device 10 may determine which map data and which selected locations to include within a geographic area depicted within the map viewport 202. When the user pans or zooms on the map display 200 changing the map viewport 202, the client computing device 10 may identify different selected locations that are included within the geographic area depicted by the map viewport 202.

In any event, the map display 200 may include map features such as roads, streets, highways, bodies of water, etc., as well as map labels such as Yehuda and Noah Moses St., HaShalom Bridge, and Ayalon Highway. Additionally, the map display 200 may include indications of organizations 214-218 at selected organization locations 204-208. In an exemplary scenario, the organization may be a fictitious clothing store named Logo, Inc. and the indications 214-218 may be branded pins for Logo, Inc. Each of the indications 214-218 may be placed at Logo, Inc. locations 204-208 on the map display 200. For example, three Logo, Inc. locations 204-208 may be adjacent to Ayalon Highway. In this manner, the user viewing the map display 200 may be in an exposed group for each of the selected organization locations 204-208.

The location awareness engine 68 may determine the number of times a selected organization location 204 is included in the user's viewport 202. For example, each time the user requests a map display or changes the map viewport 202, the client computing device 10 may transmit indications to the server device 60 of the selected organizations locations that are presented to the user. In some embodiments, the client computing device 10 may also transmit a timestamp with the indications of selected organization locations. The server device 60 may use this information to determine whether the user is eligible for a location awareness survey at one of the selected organization locations. Furthermore, each time the user requests a map display or changes the map viewport 202, the client computing device 10 may transmit indications to the server device 60 of unselected organization locations included within the map viewport 202. The client computing device 10 may also transmit a timestamp with the indications of unselected organization locations. The server device 60 may use this information to determine whether the user is eligible for a location awareness survey at one of the unselected organization locations.

In some embodiments, the user may be eligible for a location awareness survey when a set of eligibility characteristics have been met for the organization location. The eligibility characteristics may include whether the organization location has been presented to the user a threshold number of times (e.g., 3 times, 5 times, 7 times, etc.), whether a minimum threshold period of time has passed since the user last viewed the organization location (e.g., 30 minutes, 1 hour, 2 hours, etc.), and whether less than a maximum threshold period of time has passed since the user last viewed the organization location (e.g., 2 days, 3 days, 5 days, 7 days, etc.). In other embodiments, eligibility may be based on any suitable combination of these eligibility characteristics or any single eligibility characteristic. The set of eligibility characteristics may be the same for exposed organization locations and unexposed organization locations. Each time the user requests a map display or changes the map viewport 202, the server device 60 determines the number of times each of the exposed and unexposed organization locations have been included in a map viewport presented to the user. For each of the exposed and unexposed organization locations, the server device 60 may also determine the amount of time since the user last viewed a map viewport including the organization location.

When the user is eligible for a location awareness survey for a particular organization location (e.g., selected organization location 204), the server device 60 may transmit an icon such as a question mark to display at the organization location 204. The icon may correspond to a location awareness survey requesting the user to identify the organization at the organization location 204. If the user correctly identifies the organization, the server device 60 may determine that the user recognized the organization location. These results may suggest that presenting the branded pin or other indication of Logo, Inc. at location 204 made the user aware of the Logo, Inc. location.

Moreover, unselected Logo, Inc. locations (e.g., the locations which are not selected by the random filter) may not be displayed with an indication of the corresponding organization. For example, location 210 may be a Logo, Inc. location but may not include a Logo, Inc. branded pin or any other type of Logo, Inc. indication. In this manner, the user viewing the map display 200 may be in a control group for unselected organization location 210. The location awareness engine 68 may determine the number of times unselected organization location 210 is included in the user's viewport 202 in a similar manner as with the selected locations 204-208. When a map viewport 202 which includes unselected organization location 210 has been presented to the user a threshold number of times and/or a threshold period of time has passed since the map viewport 202 was presented to the user, the server device 60 may transmit an icon such as a question mark to display at unselected organization location 210, or an instruction to display such an icon. The icon may correspond to a location awareness survey requesting the user to identify the organization at unselected organization location 210.

If the user correctly identifies the organization at unselected organization location 210, the location awareness engine 68 may determine that the user recognized the brand and has not been made aware of the organization location because it was never shown on the user's map display 200. The server device 60 may receive data from several users in the exposed group and in the control group for a particular organization location. The number of users in the exposed group who correctly identified the organization may be compared to the number of users in the control group who correctly identified the organization. In some embodiments, the server device 60 may determine that location awareness increased for a particular organization location based on the difference in the number of users in the exposed group and the control group who correctly identified the organization. More specifically, the server device 60 may determine that location awareness increased for a particular organization based on the difference between the percentage of users in the exposed group and the control group who correctly identified the organization.

While the indications of organizations 214-218 are depicted as branded pins in the map display 200, this is merely one example embodiment. In other embodiments, organizations may be indicated at selected locations via advertisements, pins adjacent to names of the organizations, another type of symbol for the organizations, etc. Further, while only one organization is included in the map display 200, this is merely for ease of illustration only. Any suitable number of organizations may be depicted in the map display for selected locations.

Figure 2B:
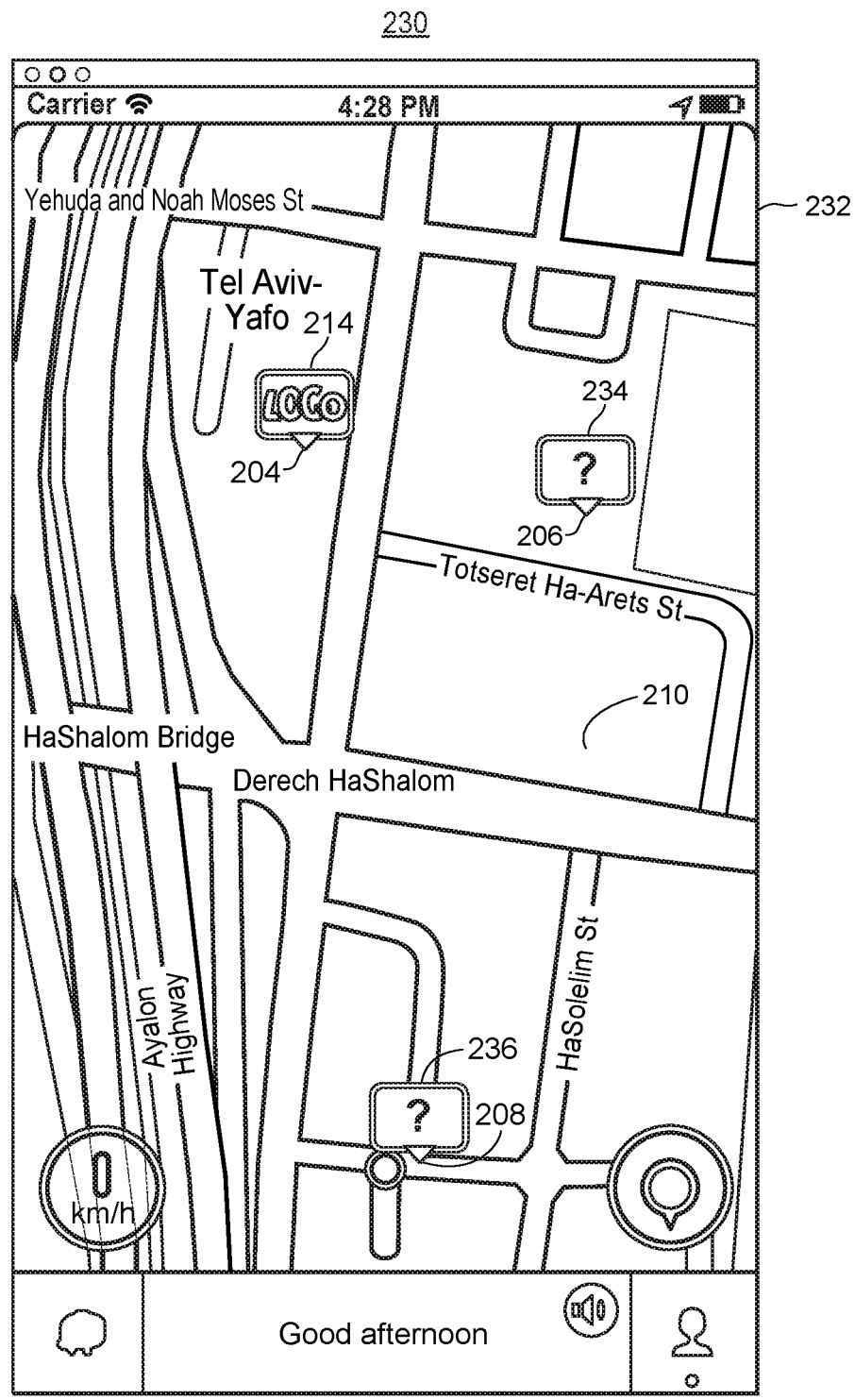
FIG. 2B is another example map display including interactive icons for activating a location awareness survey at some of the organization locations, which the location awareness system of FIG. 1 can generate.

FIG. 2B illustrates another map display 230 including a map viewport 232 depicting a similar portion of Tel Aviv as in FIG. 2A after the user is eligible to receive location awareness surveys. For example, the user may be eligible to receive location awareness surveys at selected organization locations 206, 208 as shown in FIG. 2A. This may be because the selected organization locations 206, 208 have been presented to the user a threshold number of times, a minimum threshold period of time has passed since the user last viewed the selected organization locations 206, 208, and less than a maximum threshold period of time has passed since the user last viewed the selected organization locations 206, 208.

Additionally, the user may not be eligible to receive location awareness surveys at selected organization location 204 and unselected organization location 210 as shown in FIG. 2A. This may be because selected organization location 204 has not been presented to the user a threshold number of times (or unselected location 210), a minimum threshold period of time has not passed since the user last viewed selected organization location 204 (or unselected location 210), or more than a maximum threshold period of time has passed since the user last viewed selected organization location 204 (or unselected location 210).

In any event, the icon display 24 may display icons such as question marks 234, 236 at the organization locations 206, 208 where the user is eligible to take a location awareness survey. In some embodiments, the user may select one of the icons 234, 236 to take the location awareness survey for the corresponding organization location 206, 208 by touch-selecting, clicking on, double-clicking on, or hovering over the icon for example. In other embodiments, the location awareness survey may automatically appear adjacent to one of the icons 234, 236 or in another window of the map display 230 without user interaction (e.g., at the top, bottom, left side, or right side of the map display or overlaid on the map viewport 232).

While the map display 230 includes two icons for taking location awareness surveys for corresponding organization locations, any number of icons may be included in the map display 230. Icons may be presented on the map display 230 for exposed organization locations (e.g., selected organization locations 204-208) as well as unexposed organization locations (e.g., unselected organization location 210). In some embodiments, the map display 230 may only include one icon at a time for taking a location awareness survey and/or may hide all other indications of organizations on the map display 230. This technique may be performed to prevent from giving the user any hints about the organization corresponding to the organization location. For example, the user may not remember the name of the organization at organization location 208. However, the indication 214 of organization location 204 may remind the user that organization location 208 is also Logo, Inc. In other embodiments, the map display 230 may include several icons at a time while also presenting indications of other organization locations.

Figure 2C:
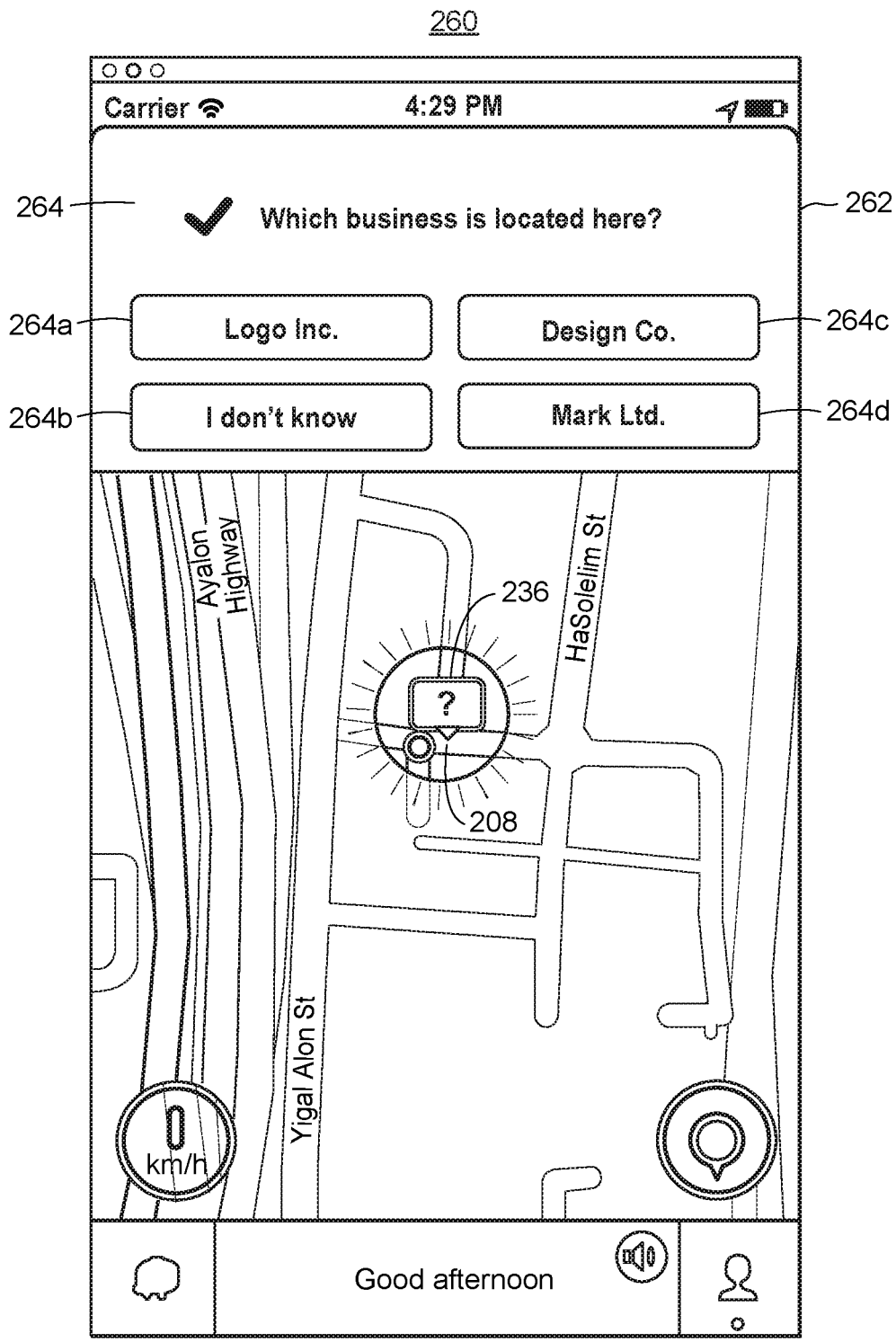
FIG. 2C is yet another example map display including a location awareness survey for one of the organization locations, which the location awareness system of FIG. 1 can generate.

FIG. 2C illustrates another example map display 260 including a map viewport 262 depicting a similar portion of Tel Aviv as in FIG. 2B and a location awareness survey 264. In some embodiments, the map display 260 may be presented in response to the user selecting the icon 236 at organization location 208. The location awareness survey 264 may ask the user to identify the business or other organization at organization location 208. Additionally, the location awareness survey 264 may include several answer choices including the correct organization (Logo, Inc.) 264a, competitors of the correct organization (fictitious Design Co. and Mark Ltd. which may be other clothing stores) 264c-d, and "I don't know" 264b. The user may select one of the answer choices by touch-selecting the answer choice, clicking on the answer choice, or in any other suitable manner. When one of the choices is selected, the client computing device 10 may transmit the user's answer to the server device 60. In other embodiments, the client computing device 10 may evaluate whether the answer is correct and may transmit an indication of whether or not the user provided the correct answer to the server device 60.

Accordingly, the location awareness engine 68 may categorize the user's answer as correct or incorrect and from the exposed group or the control group for the organization location. For a particular organization location (e.g., organization location 208), the server device 60 may receive answers from several users in the exposed group and several users in the control group from the users' client computing devices 10. Then the server device 60 may determine the amount or percentage of users who correctly identified Logo, Inc. at organization location 208 from the exposed group (e.g., 70 percent of the users). Additionally, the server device 60 may determine the number or percentage of users who correctly identified Logo, Inc. at organization location 208 from the control group (e.g., 35 percent of the users). The amount of users who correctly identified Logo, Inc. in the exposed group may be compared to the amount of users who correctly identified Logo, Inc. in the control group. A location awareness metric may be determined for the organization location 208 based on the comparison. In this example, the server device 60 may determine that users in the exposed group were twice as likely to correctly identify Logo, Inc. at organization location 208 as users in the control group. Therefore, location awareness increased by 100 percent for organization location 208. In some embodiments, the server device 60 may perform a significance test to determine whether the difference is statistically significant between the amount of users who correctly identify the organization in the exposed group and in the control group.

The location awareness metric may then be transmitted by the server device 60 to an organization server 36 (e.g., Logo, Inc.). In some embodiments, a brand awareness metric may also be transmitted to the organization server 36. The location awareness metric may be the total number of users who correctly identified Logo, Inc. at organization location 208 from the exposed group (e.g., 200 users), may be a percentage of users who correctly identified Logo, Inc. at organization location 208 from the exposed group (e.g., 70 percent of the users), may be the difference between the amount of users in the exposed group and the control group who correctly identified Logo, Inc. at organization location 208 (e.g., users in exposed group were twice as likely to correctly identify Logo, Inc. at organization location 208 as users in the control group), or may be any other suitable metric indicative of location awareness at organization location 208. The brand awareness metric may be the total number of users who correctly identified Logo, Inc. at organization location 208 from the control group (e.g., 100 users), may be a percentage of users who correctly identified Logo, Inc. at organization location 208 from the control group (e.g., 35 percent of the users), or may be any other suitable metric indicative of brand awareness at organization location 208.

In some scenarios, the server device 60 may transmit location awareness metrics and/or brand awareness metrics for each of an organization's locations to the organization server 36. Moreover, the server device 60 may combine location awareness metrics for each of an organization's locations to generate a total location awareness metric for the organization. For example, the server device 60 may calculate an average percentage increase in location awareness at each individual organization location to generate the total location awareness metric. In another scenario, the server device 60 may combine location awareness metrics for each of an organization's location within a geographic region to generate a regional location awareness metric for the organization. For example, the server device 60 may determine an Israeli location awareness metric for Logo, Inc., an American location awareness metric for Logo, Inc., a Canadian location awareness metric for Logo, Inc., etc.

In some embodiments, the organization server 36 may analyze the location awareness metric for an organization location to determine whether to display commercial content, such as an advertisement, a branded pin, an offer, etc., at the organization location. Additionally, the organization server 36 may analyze the total location awareness metric or a regional location awareness metric to identify geographic locations at which to display commercial content for the organization, such as an advertisement, a branded pin, an offer, etc. The organization server 36 may then transmit a communication to the server device 60 including commercial content or a type of commercial content to present on a map display and indicating geographic locations at which to display the commercial content.

For example, when location awareness does not increase or does not increase by more than a threshold amount at a particular organization location, the organization server 36 may transmit a different type of commercial content to present on the map display at the organization location (e.g., an advertisement, a branded pin, an offer, etc.). Alternatively, the organization server 36 may transmit a communication to the server device 60 to stop providing commercial content at the organization location. In another example, when location awareness increases or increases by more than a threshold amount at a particular organization location, the organization server 36 may transmit a communication to the server device 60 to continue to provide the same commercial content at the organization location on the map display. Additionally, the organization server 36 may instruct the server device 60 to provide the commercial content at the organization location to all users and to remove the control group. In this manner, location awareness may increase at the organization location for all of the users.

In some implementations, at least some of the functions discussed above with reference to the organization server 36 can be implemented in the server device 60. For example, the organization server 36 may provide various commercial data to the server device 60, and the location awareness engine 68 and/or other components of the location awareness system can automatically assess location awareness and select appropriate locations for displaying commercial content, or the location awareness system can attempt to improve location awareness in certain regions prior to displaying the commercial content.

Example Methods for Increasing Location Awareness

Figure 3:
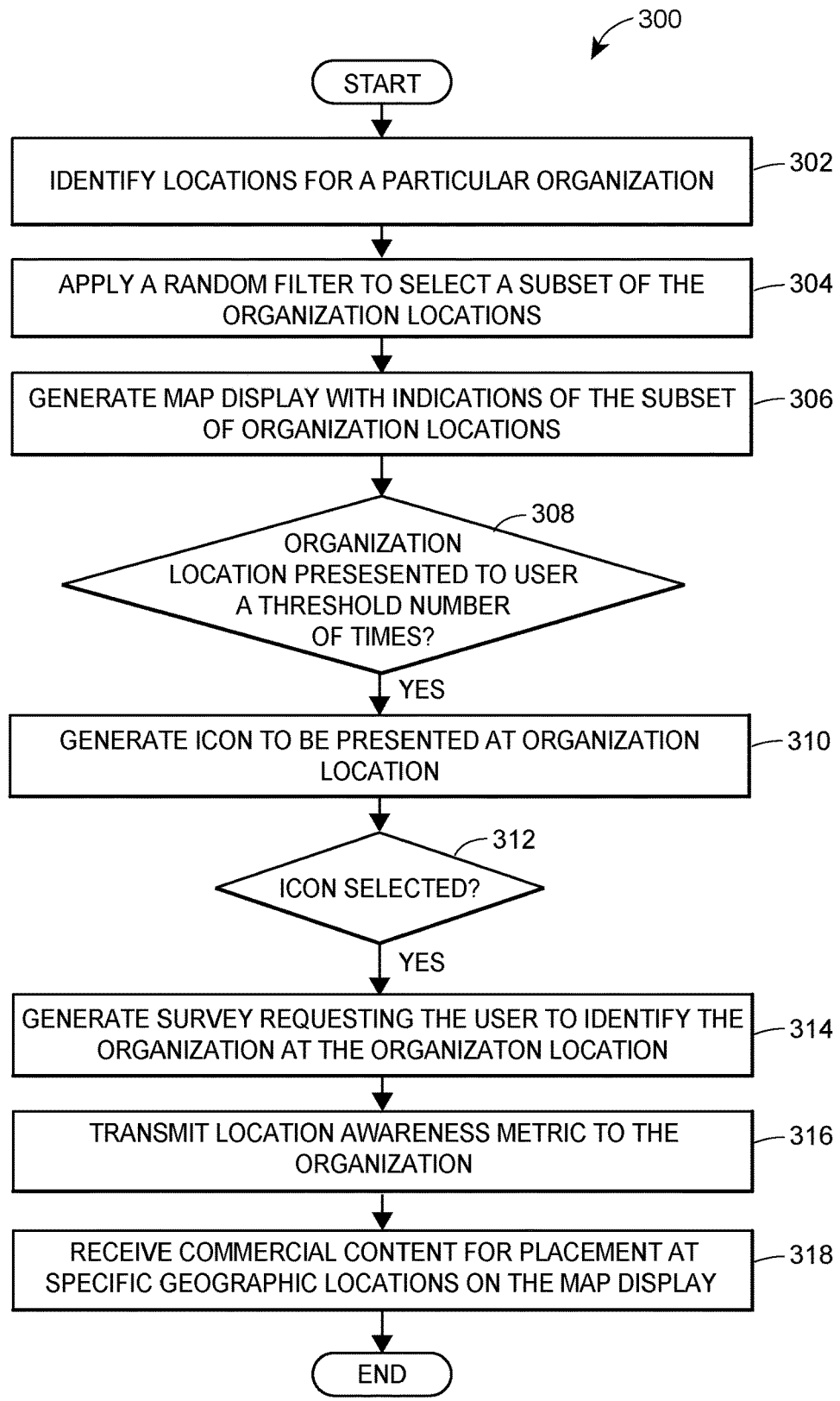
FIG. 3 is a flow diagram of an example method for measuring location awareness for an organization, which can be implemented in a server device operating in a location awareness system.

FIG. 3 illustrates a flow diagram of an example method 300 for measuring location awareness. The method can be implemented in a set of instructions stored on a computer-readable memory and executable at one or more processors of the server device 60. For example, the method can be implemented by the location awareness engine 68.

At block 302, the server device 60 may identify each of the locations that correspond to a particular organization. For example, Logo, Inc. may have several retail locations throughout Israel and the United States. Accordingly, the server device 60 may identify each of these locations. In another embodiment, the server device 60 may identify locations that correspond to a particular organization based on the location of the user. When the user chooses to participate in a location awareness survey, the user may also allow the client computing device 10 to transmit its location. Then the server device 60 may select a geographic region for the location awareness survey, such as Israel, the United States, Texas, California, etc. based on the user's location. In this manner, the user participates in a location awareness survey regarding organization locations she is likely to visit.

In any event, at block 304, the server device 60 may apply a random selection function such as a random filter to select a subset of the organization locations. In some embodiments, the random filter may be applied to select a subset of the organization locations within the geographic region. The server device 60 may determine the amount of the organization locations to be selected by the random filter. For example, 90 percent, 80 percent, 75 percent, etc., of the organization locations may be selected and indications of the organization may be presented to the user at the selected organization locations. The remaining 10 percent, 20 percent, 25 percent, etc., of the locations may not be presented to the user with indications of the organization and the user may be in a control group for the remaining locations that are not in the subset. The random filter selects each organization location for the subset at random until the determined amount of organization locations has been selected.

In some embodiments, the random filter may be applied several times to select a different subset of the organization locations for each of several users. For example, when several users indicate their willingness to participate in the location awareness survey, a subset of 9 out of 10 Logo, Inc. locations may be selected by the random filter and displayed on a first user's client computing device. A different subset of 9 Logo, Inc. locations may be selected by the random filter and displayed on a second user's client computing device. As a result, the same Logo, Inc. location may be a selected location for the first user and an unselected location for the second user. Thus, the first user may be in the exposed group for the Logo, Inc. location and the second user may be in the control group.

In response to a request for map data for a geographic area from the client computing device 10, the server device 60 may generate a map display of the geographic area. For example, the server device 60 may communicate with the map data server 50 to obtain map data for the geographic area. The map display may include indications of the organization (e.g., branded pins, advertisements, pins adjacent to the name of the organization, etc.) at the organization locations within the subset (the exposed group). Additionally, the map display may not present an indication of the organization at organization locations which are not included in the subset. In this manner, the user may be a part of a control group for the organization locations which are not included in the subset. The control group may be used to test whether users are more likely to correctly identify the organization corresponding to the organization location when they are presented with an indication of the organization at the organization location on the map display. The map display may be transmitted to the client computing device 10 and presented via the icon display 24 of the mapping application 22.

In other embodiments, the server device 60 may generate map data for the geographic area and/or may identify organization locations within the subset that are also within the geographic area. Then the server device 60 may transmit the map data, indications of the organization, and the organization locations within the subset to the client computing device 10. In turn, the icon display 24 may render the map viewport within the map display according to the map data, indications of the organization, and the organization locations within the subset.

In some scenarios, the server device 60 may determine organization locations within the geographic area for including an indication of the organization (e.g., branded pins, advertisements, pins adjacent to the name of the organization, etc.). The server device 60 may identify a threshold number of organization locations at which to display the indication of the organization. For example, 5 organization locations may be displayed with branded pins in a map viewport. The server device 60 may then rank and/or score the organization locations in any suitable manner. For example, the organization locations may be ranked and/or scored based on popularity, size, etc. The server device 60 may then identify the organization locations ranked at or above the threshold number (e.g., the top 5 ranked organization locations within the geographic area). Exposed organization locations may be ranked and identified as well as unexposed organization locations.

When an unexposed organization location is identified, the server device 60 may provide a request to the client computing device 10 not to display the indication of the organization at the unexposed organization location. However, when the map viewport is presented on the client computing device 10, the client computing device 10 may transmit the unexposed organization location to the server device 60 as if an indication of the organization was displayed at the unexposed organization location. In this manner, the server device 60 may determine whether the user is eligible to receive a location awareness survey for the unexposed organization location in a similar manner as eligibility is determined for an exposed organization location.

In yet other embodiments, the server device 60 may generate a map display or map data for an entire geographic region (e.g., Israel, the United States, etc.) including each of the selected organization locations within the geographic region. The server device 60 may then transmit the map display or map data for the entire geographic region to the client computing device 10. Then the icon display 24 may obtain a geographic area to display in the map viewport on the client computing device 10 and may identify a corresponding portion of the map display or map data to present in the map viewport.

In any event, each time map data is displayed in the map viewport, the client computing device 10 may transmit the selected organization locations that are presented to the user to the server device 60. In some embodiments, the client computing device 10 may also transmit a timestamp with the selected organization locations. Additionally, the client computing device 10 may transmit the unselected organization locations that are within the user's map viewport to the server device 60.

For each organization location, the server device 60 determines the number of times the organization location is presented to the user. For example, each time an organization location is displayed in the map viewport of the map display, the server device 60 may receive an indication and may increment the number of times the organization location has been presented to the user. In some embodiments, when an organization location is displayed in the map viewport for more than a threshold duration (e.g., 10 minutes, 30 minutes, an hour, etc.) the server device 60 may increment the number of times the organization location has been presented to the user. In some embodiments, the server device 60 may determine that an organization location has been presented to the user even when the organization location is not included in the subset and accordingly, an indication of the organization is not displayed at the organization location. In this manner, the server device 60 may provide the location awareness survey for organization locations in the control group as well as organization locations in the exposed group.

The server device 60 may then determine whether a set of eligibility characteristics have been met for an organization location (block 308). For example, the server device 60 may determine whether the organization location has been presented to the user a threshold number of times (e.g., 3 times, 5 times, 7 times, etc.), whether a minimum threshold period of time has passed since the user last viewed the organization location (e.g., 30 minutes, 1 hour, 2 hours, etc.), and whether less than a maximum threshold period of time has passed since the user last viewed the organization location (e.g., 2 days, 3 days, 5 days, 7 days, etc.). In other embodiments, eligibility may be based on any suitable combination of these eligibility characteristics or any single eligibility characteristic.

When the set of eligibility characteristics have been met for an organization location, an icon may be generated and transmitted to the client computing device 10 for display at the organization location in place of the indication of the organization (block 310). The icon may be a question mark or any other suitable icon which indicates to the user that the icon corresponds to a location awareness survey regarding the organization location. Moreover, the icon may not identify the organization. As mentioned above, the icon may be presented at an organization location within the subset or an organization location that is not included in the subset.

When the user selects the icon (block 312), the server device 60 may generate and transmit the location awareness survey for the organization location to the client computing device 10 (block 314). The location awareness survey may include a request for the user to identify the name of the organization corresponding to the location and may include several answer choices including the correct organization, incorrect organizations, and "I don't know." In other embodiments, the location awareness survey may automatically be presented with the icon without receiving user input. For example, the location awareness survey may be presented above the map viewport, below the map viewport, overlaid on the map viewport, or on the right or left side of the map viewport while the icon is displayed.

In any event, the server device 60 may receive an indication of the user's selected answer choice. Based on the answers from several users in the exposed group and in the control group for the organization location, the server device 60 may generate and transmit a location awareness metric for the organization location to an organization server 36 (block 316). The location awareness metric may indicate the number of users in the exposed group who correctly identified the organization at the organization location (e.g., 100 users, 1000 users, etc.) or the amount or percentage of users in the exposed group who correctly identified the organization (e.g., 50 percent, 70 percent, etc.). In other embodiments, the location awareness metric may be indicative of an increase in location awareness at the organization location. For example, the location awareness metric may be determined by comparing the likelihood that users in the exposed group correctly identified the organization to the likelihood that users in the control group correctly identified the organization. The increase in location awareness may be measured as the difference between the amount of users in the exposed group who correctly identified the organization and the amount of users in the control group who correctly identified the organization.

In some embodiments, the server device 60 may also generate and transmit a brand awareness metric for the organization location to the organization server 36. The brand awareness metric may indicate the number of users in the control group who correctly identified the organization at the organization location (e.g., 100 users, 1000 users, etc.) or the amount or percentage of users in the control group who correctly identified the organization (e.g., 50 percent, 70 percent, etc.).

Based on the location awareness metric and/or the brand awareness metric, the organization server 36 may identify commercial content, such as an advertisement, a branded pin, an offer, etc., to present at specific geographic locations on the map display. The server device 60 may then receive a communication from the organization server 36 including commercial content or a type of commercial content to present on the map display and indicating geographic locations at which to display the commercial content (block 318). In response to receiving the communication, the server device 60 may provide the commercial content to the client computing device 10. Moreover, the server device 10 may instruct the client computing device 10 to present the commercial content at the indicated geographic locations on the map display.

For example, when location awareness does not increase or does not increase by more than a threshold amount at a particular organization location, the organization server 36 may transmit a different type of commercial content to present on the map display at the organization location (e.g., an advertisement, a branded pin, an offer, etc.). Alternatively, the organization server 36 may transmit a communication to the server device 60 to stop providing commercial content at the organization location. In another example, when location awareness increases or increases by more than a threshold amount at a particular organization location, the organization server 36 may transmit a communication to the server device 60 to continue to provide the same commercial content at the organization location on the map display. Additionally, the organization server 36 may instruct the server device 60 to provide the commercial content at the organization location to all users and to remove the control group.

Figure 4:
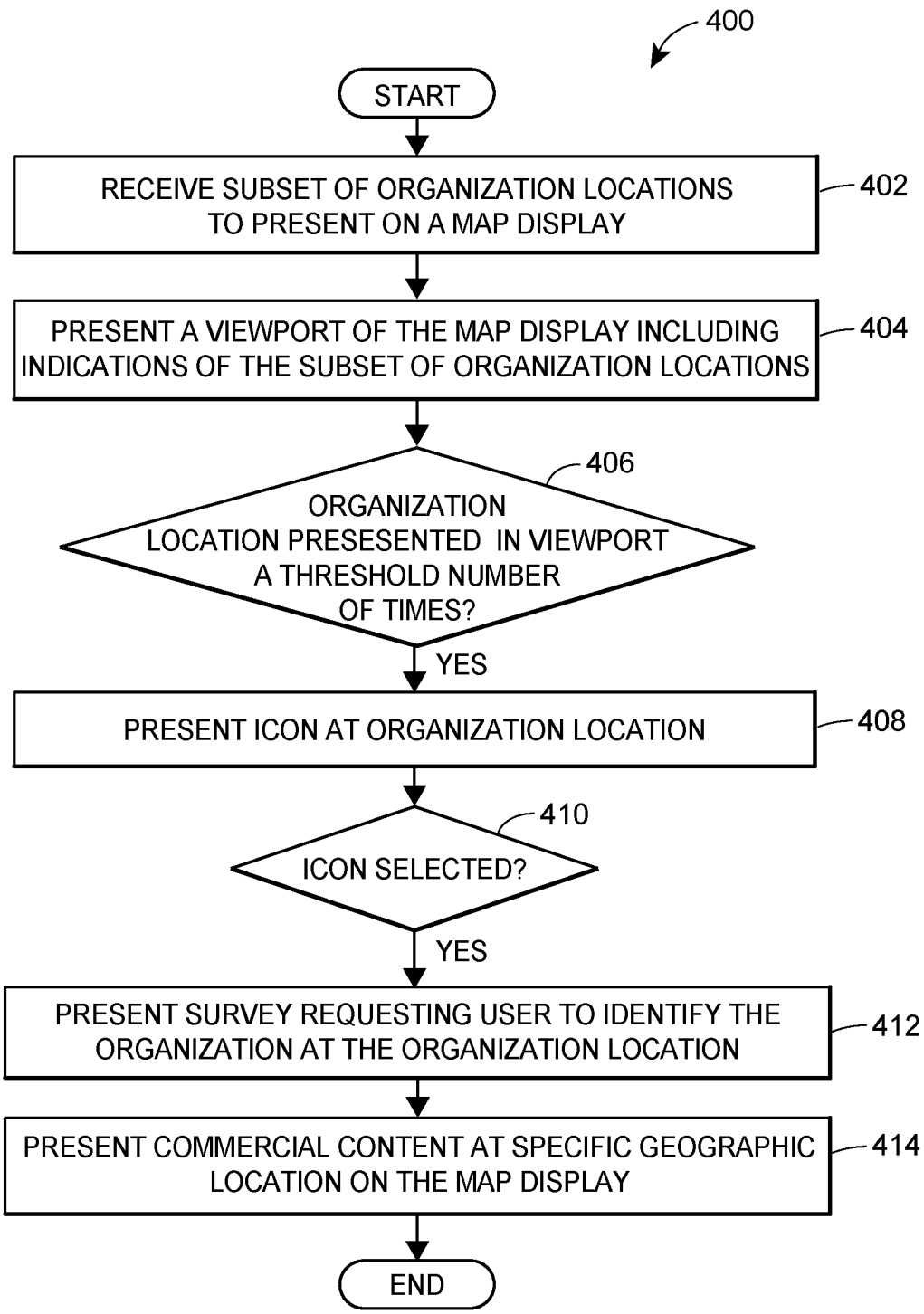
FIG. 4 is a flow diagram of an example method for presenting a location awareness survey on a map display of a geographic area, which can be implemented in a client computing device that operates in, or cooperates with, a location awareness system.

FIG. 4 illustrates a flow diagram of an example method 400 for presenting a location awareness survey on a map display of a geographic area. The method can be implemented in a set of instructions stored on a computer-readable memory and executable at one or more processors of the client computing device 10. For example, the method can be implemented by the icon display 24 within the mapping application 22.

At block 402, the icon display 24 may receive a subset of organization locations from a server device 60 for a particular organization to present on a map display. As mentioned above, the server device 60 may select the subset of organization locations using a random selection function, such as a random filter. In some embodiments, the client computing device 10 may transmit a request to the server device 60 for map data for a geographic area corresponding to a map viewport. Accordingly, the server device 60 may provide the organization locations in the subset that are also within the geographic area. The server device 60 may also provide map data for the geographic area from the map data server 50, for example. In other embodiments, the server device 60 may provide each of the organization locations in the subset to the client computing device 10 and the icon display 24 may identify the organization locations in the subset that are also within the geographic area.

In any event, at block 404, the icon display 24 may present the organization locations within the map viewport of a map display, such as the map display 200 as show in FIG. 2A. Each organization location within the subset may be presented with an indication of the corresponding organization. The indication may be a branded pin, an advertisement for the organization, a pin adjacent to the name of the organization, or any other suitable symbol indicative of the organization. Additionally, each organization location that is not included within the subset but is within the geographic area corresponding to the map viewport may not be presented with an indication of the corresponding organization.

For each organization location, the icon display 24 may determine the number of times that the organization location has been presented to the user along with other eligibility characteristics for receiving a location awareness survey. Eligibility characteristics may include whether the organization location has been presented to the user a threshold number of times (e.g., 3 times, 5 times, 7 times, etc.), whether a minimum threshold period of time has passed since the user last viewed the organization location (e.g., 30 minutes, 1 hour, 2 hours, etc.), and whether less than a maximum threshold period of time has passed since the user last viewed the organization location (e.g., 2 days, 3 days, 5 days, 7 days, etc.). In other embodiments, eligibility may be based on any suitable combination of these eligibility characteristics or any single eligibility characteristic.

When the eligibility characteristics have been satisfied for an organization location (block 406), the icon display 24 may present an icon at the organization location. The icon may be a question mark or any other suitable icon which indicates to the user that the icon corresponds to a location awareness survey regarding the organization location. The icon may not identify the organization. In some embodiments, the icon may be selectable and may provide a link to a location awareness survey. For example, upon receiving a touch-selection, a mouse click, or a double click, the icon display 24 may present a location awareness survey (block 412). In other embodiments, the location awareness survey may automatically be presented with the icon without receiving user input. For example, the location awareness survey may be presented above the map viewport, below the map viewport, overlaid on the map viewport, or on the right or left side of the map viewport while the icon is displayed.

The location awareness survey may be similar to the location awareness survey 264 as shown in FIG. 2C and may include a request for the user to identify the name of the organization corresponding to the location. The location awareness survey may also include several answer choices including the correct organization, incorrect organizations, and "I don't know." Upon receiving a selection of one of the answer choices, the icon display 24 may transmit the selected answer choice to the server device 60 and/or may transmit an indication of whether the user selected the correct answer to the server device 60. In some embodiments, the icon display 24 may also transmit an indication of the organization location for the location awareness survey and an indication of whether the user is in the control group or the exposed group for the organization location.

Based on this information and similar information from several other client computing devices 10, the server device 60 may generate and transmit a location awareness metric to an organization server 36. In some embodiments, the server device 60 may also generate and transmit a brand awareness metric. In response, the server device 60 may receive commercial content to be presented on the map display and specific geographic locations for presenting the commercial content. The commercial content and specific geographic locations may be forwarded to the client computing device 10. Accordingly, the icon display 24 may present the commercial content at the specified geographic locations on the map display when the specified geographic locations are within the map viewport (block 414).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 300 and 400 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 300 and 400 may be included as part of any backend server (e.g., a map data server, an organization server, or any other type of server computing device, as described herein), client computing device modules of the example environment, for example, or as part of a module that is external to such an environment. Though the Figs. may be described with reference to the other Figs. for ease of explanation, the methods 300 and 400 can be utilized with other objects and user interfaces. Furthermore, although the explanation above describes steps of the methods 300 and 400 being performed by specific devices (such as a client computing device 10 and a server device 60), this is done for illustration purposes only. The blocks of the methods 300 and 400 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the Figs. depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for increasing location awareness through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for measuring location awareness of organizations on a map display, the method comprising:
    for a particular organization, identifying, by one or more processors, a plurality of locations to present on a map display of a geographic area;
    applying, by the one or more processors, a random selection function to select a subset of the plurality of organization locations, wherein the subset includes fewer locations than the plurality of organization locations;
    causing, by the one or more processors, the map display of the geographic area to be presented to a user including placing an indication of the organization at each of the subset of organization locations on the map display;
    when an organization location within the geographic area has been presented to the user a predetermined threshold number of times:
        causing, by the one or more processors, an icon to be presented in place of the indication of the organization at the organization location, wherein the icon does not identify the organization;
        in response to receiving a selection of the organization location represented by the icon, causing, by the one or more processors, a request to be presented for the user to identify the organization corresponding to the organization location, wherein the request includes an indication of the organization and an indication of at least one other organization;
        providing, by the one or more processors to an organization computing device, a location awareness metric for the organization location based on the user's response to the request to identify the organization, wherein the location awareness metric is indicative of commercial content presented on the map display; and
    receiving, by the one or more processors, commercial content for placement at specific geographic locations on the map display in accordance with the location awareness metric.

2. The method of claim 1, wherein the icon is presented when the organization location has been presented to the user the predetermined threshold number of times and has not been presented to the user within a threshold period of time.

3. The method of claim 1, wherein to filter out information indicative of brand awareness from information indicative of location awareness, the method further comprises:
    causing, by the one or more processors, an icon to be presented at one of the plurality of organization locations not included in the subset when the organization location not included in the subset is presented to the user a predetermined threshold number of times;
    in response to receiving a selection of the organization location represented by the icon, causing, by the one or more processors, a request to be presented for the user to identify the organization corresponding to the organization location not included in the subset, wherein the request includes an indication of the organization and an indication of at least one other organization; and
    providing, by the one or more processors to the organization computing device, a brand awareness metric for the organization based on the user's response to the request to identify the organization.

4. The method of claim 3, further comprising:
causing, by the one or more processors, the map display of the geographic area to be presented to a plurality of users, wherein for at least some of the plurality of users, the icon is presented at an organization location included in the subset and for at least some other of the plurality of users, the icon is presented at an organization location not included in the subset.

5. The method of claim 4, further comprising:
applying, by the one or more processors, the random selection function to select a different subset of the plurality of organization locations for each of the plurality of users; and
for each user, causing, by the one or more processors, the map display of the geographic area to be presented to the user including placing the indication of the organization at each of the subset of organization locations corresponding to the user.

6. The method of claim 4, further comprising:
comparing, by the one or more processors, a likelihood that the at least some users, who received the request for the organization location included in the subset, correctly identified the organization to the likelihood that the at least some other users, who received the request for the organization location not included in the subset, correctly identified the organization; and
for each of the plurality of organization locations, providing, by the one or more processors to the organization computing device, a location awareness metric while filtering out brand awareness for the respective organization location based on the comparison.

7. The method of claim 6, wherein the organization location included in the subset for a first user of the plurality of users and the organization location not included in the subset for a second user of the plurality of users are a same location.

8. The method of claim 6, wherein the location awareness metric indicates a difference in a number of users who correctly identified the corresponding organization when the organization location is included in the subset to a number of users who correctly identified the corresponding organization when the organization location is not included in the subset, and wherein the difference indicates an amount that location awareness increased for the organization location by presenting the indication of the organization.

9. A computing device for measuring location awareness, the computing device comprising:
one or more processors; and
a non-transitory computer-readable memory coupled to the one or more processors and storing instructions thereon that, when executed by the one or more processors, cause the computing device to:
identify, for a particular organization, a plurality of locations to present on a map display of a geographic area;
apply a random selection function to select a subset of the plurality of organization locations, wherein the subset includes fewer locations than the plurality of organization locations;
cause the map display of the geographic area to be presented to a user including placing an indication of the organization at each of the subset of organization locations on the map display;
when an organization location within the geographic area has been presented to the user a predetermined threshold number of times:
cause an icon to be presented in place of the indication of the organization at the organization location, wherein the icon does not identify the organization;
in response to receiving a selection of the organization location represented by the icon, cause a request to be presented for the user to identify the organization corresponding to the organization location, wherein the request includes an indication of the organization and an indication of at least one other organization;
provide, to an organization computing device, a location awareness metric for the organization location based on the user's response to the request to identify the organization, wherein the location awareness metric is indicative of commercial content presented on the map display; and
receive commercial content for placement at specific geographic locations on the map display in accordance with the location awareness metric.

10. The computing device of claim 9, wherein the icon is presented when the organization location has been presented to the user the predetermined threshold number of times and has not been presented to the user within a threshold period of time.

11. The computing device of claim 9, wherein to filter out information indicative of brand awareness from information indicative of location awareness, the instructions further cause the computing device to:
cause an icon to be presented at one of the plurality of organization locations not included in the subset when the geographic area which includes the organization location not included in the subset is presented to the user a predetermined threshold number of times;
in response to receiving a selection of the organization location represented by the icon, cause a request to be presented for the user to identify the organization corresponding to the organization location not included in the subset, wherein the request includes an indication of the organization and an indication of at least one other organization; and
provide, to the organization computing device, a brand awareness metric for the organization based on the user's response to the request to identify the organization.

12. The computing device of claim 11, wherein the instructions further cause the computing device to:
cause the map display of the geographic area to be presented to a plurality of users, wherein for at least some of the plurality of users, the icon is presented at an organization location included in the subset and for at least some other of the plurality of users, the icon is presented at of an organization location not included in the subset.

13. The computing device of claim 12, wherein the instructions further cause the computing device to:
apply the random selection function to select a different subset of the plurality of organization locations for each of the plurality of users; and
for each user, cause the map display of the geographic area to be presented to the user including placing the indication of the organization at each of the subset of organization locations corresponding to the user.

14. The computing device of claim 12, wherein the instructions further cause the computing device to:
compare a likelihood that the at least some users, who received the request for the organization location included in the subset, correctly identified the organization to the likelihood that the at least some other users, who received the request for the organization location not included in the subset, correctly identified the organization; and for each of the plurality of organization locations, provide, to the organization computing device, a location awareness metric while filtering out brand awareness for the respective organization location based on the comparison.

15. The computing device of claim 14, wherein the organization location included in the subset for a first user of the plurality of users and the organization location not included in the subset for a second user of the plurality of users are a same location.

16. The computing device of claim 14, wherein the location awareness metric indicates a difference in a number of users who correctly identified the corresponding organization when the organization location is included in the subset to a number of users who correctly identified the corresponding organization when the organization location is not included in the subset, and wherein the difference indicates an amount that location awareness increased for the organization location by presenting an indication of the organization.

17. A client computing device for measuring location awareness, the client computing device comprising:
   a user interface;
   one or more processors coupled to the user interface; and
   a non-transitory computer-readable memory coupled to the one or more processors and storing instructions thereon that, when executed by the one or more processors, cause the client computing device to:
      present a map display of a geographic area on the user interface, wherein the geographic area includes a plurality of locations for a particular organization;
      present an indication of the organization at each of a subset of the plurality of organization locations on the map display of the geographic area, wherein the subset of organization locations includes fewer locations than the plurality of organization locations within the geographic area;
      when an organization location within the geographic area has been presented to a user a predetermined threshold number of times:
         present an icon in place of the indication of the organization at the organization location, wherein the icon does not identify the organization;
         in response to receiving a selection of the organization location represented by the icon, present a request for the user to identify the organization corresponding to the organization location, wherein the request includes an indication of the organization and an indication of at least one other organization; and
         present commercial content at specific geographic locations on the map display based on the user's response to the request to identify the organization.

18. The client computing device of claim 16, wherein the icon is presented when the organization location has been presented to the user the predetermined threshold number of times and has not been presented to the user within a threshold period of time.

19. The client computing device of claim 16, wherein to filter out information indicative of brand awareness from information indicative of location awareness, the instructions cause the client computing device to:
   present an icon at one of the plurality of organization locations not included in the subset when the organization location not included in the subset is presented to the user a predetermined threshold number of times; and
   in response to receiving a selection of the organization location represented by the icon, present a request for the user to identify the organization corresponding to the organization location not included in the subset, wherein the request includes an indication of the organization and an indication of at least one other organization.

20. The client computing device of claim 16, wherein the commercial content is presented based on a plurality of users' responses to requests to identify the organization at a plurality of client computing devices.

* * * * *